United States Patent [19]

Wilson et al.

[11] Patent Number: 4,633,057

[45] Date of Patent: Dec. 30, 1986

[54] LASER WELDER FAULT DETECTOR

[75] Inventors: Craig A. Wilson, Shelton; Stephen J. Curry, Trumbull; Kenneth Struzek, Northford; Ralph Falcigno, Milford, all of Conn.

[73] Assignee: Avco Corporation, Stratford, Conn.

[21] Appl. No.: 768,558

[22] Filed: Aug. 22, 1985

[51] Int. Cl.$^4$ .............................................. B23K 26/00
[52] U.S. Cl. ...................... 219/121 LC; 219/121 LB; 219/121 LZ; 228/103; 250/492.1; 73/24; 73/607
[58] Field of Search ................. 219/121 LZ, 121 LC, 219/121 LA, 121 LB, 121 LD, 121 LM, 121 EC, 121 ED, 121 EM; 228/104; 250/492.1; 73/643, 606, 24, 603

[56] References Cited

U.S. PATENT DOCUMENTS 4,419,562 12/1983 Jon et al. ...................... 219/121 LB
4,543,486 9/1985 Rose ............................. 219/121 LB

FOREIGN PATENT DOCUMENTS 0129462 12/1984 European Pat. Off. ..... 219/121 LZ
0009783 1/1983 Japan ............................. 219/121 LZ

*Primary Examiner*—M. H. Paschall
*Attorney, Agent, or Firm*—M. E. Frederick

[57] ABSTRACT

A laser welder fault detector system, including a microphone and an associated electronic circuit operatively connected to a solenoid actuated ink jet, is provided to detect the formation of defective welds by an intermittently energized laser and to spray ink on sheets of metal being welded to mark the location of the defective welds. Defective welds are detected by acoustic signals generated during the welding process and picked up by the microphone, the amplitude of the signals, when defective welds are being formed, being relatively low compared to those generated when normal welds are being produced. The electronic components of the system compare the acoustic signals generated during the welding process with a reference signal characteristic of the formation of a normal weld. If the comparison is not favorable, indicating that a faulty weld has been produced, and the electronic circuit detects that the laser is energized and moving relative to the sheets being welded, the solenoid of the ink jet is activated to mark the metal sheets at the location of the defective weld.

6 Claims, 5 Drawing Figures

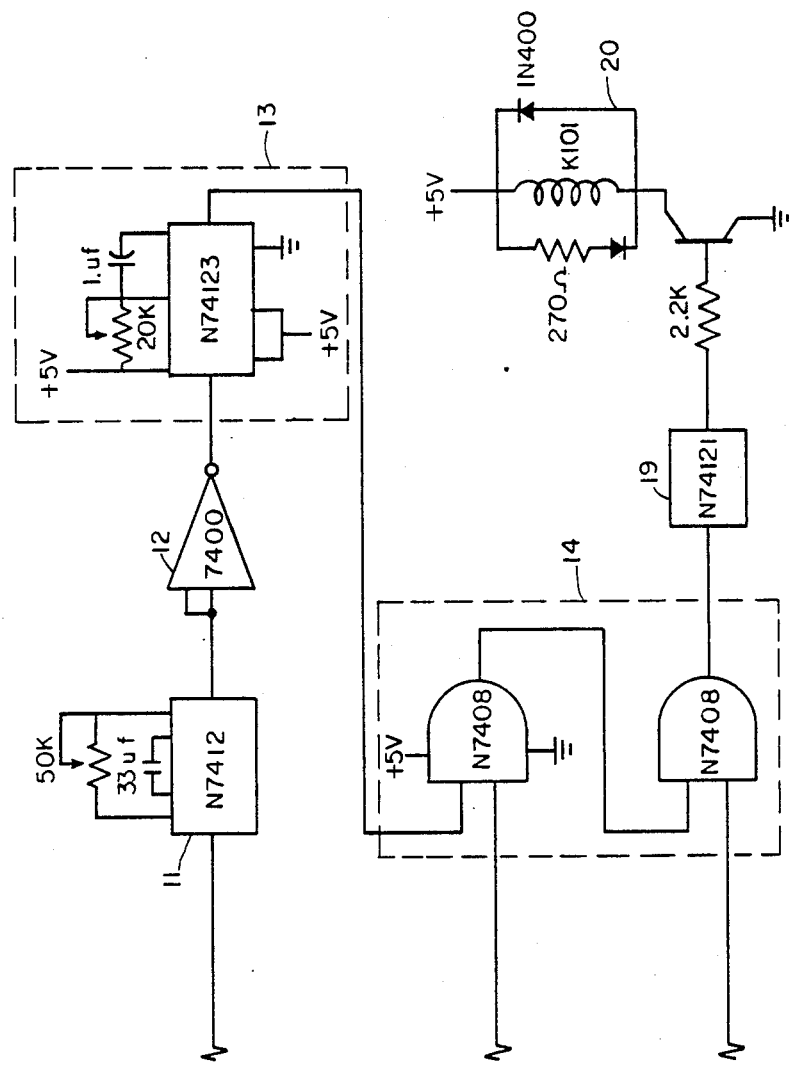
Fig. 4.B

LASER WELDER FAULT DETECTOR

BACKGROUND OF THE INVENTION

Laser welders are extensively used to weld sheets of metal together. In some applications, the sheets of metal serve as walls confining fluids under pressure, and hence the welds must be impervious to leakage. If structures incorporating the welded sheets are small and made in small numbers, the structures may be visually inspected or tested under pressure when completed and any faults in the welds repaired as necessary. However, when the amount of welding is extensive and the final structures not easily tested, it is very advantageous to detect defective welds as they are made and to mark the location of the defects. Doing so greatly facilitates their later repair.

Numerous conditions can cause faulty or defective welds. Foremost among them is interruption of normal laser operation. Further, if the sheet metal being welded is contaminated or if the sheets being joined are not clamped tightly together, the welds will be defective even though the laser itself is operating properly. The present invention makes it possible to detect faulty welds as they occur regardless of their cause. This is accomplished by noting the acoustic signals that are characteristically generated by the operation of the laser. By comparing those signals to a signal pattern characteristic of normal welding operations, the fact that a faulty weld has been made can be detected, and means can be activated to mark the location of the defect.

SUMMARY OF INVENTION

The preferred embodiment of the present invention is described in association with a laser welder used to join sheets of metal comprising components of a recuperator used to improve the efficiency of a gas turbine engine. In such an application, the recuperator serves as a heat exchanger for transmitting heat from the exhaust gases of the engine's turbine to the compressed air flowing from the last compressor stage of the engine to the inlet of its combustion chamber. For satisfactory operation, the recuperator must be gas tight, i.e., there must be no leakage of compressed air into the turbine exhaust gases. Of necessity this means that the welds in the recuperator must be impervious to leakage. Since there may be as much as 200 meters of welds in the recuperator, the welding process must be highly reliable, and faulty welds, if they do occur, must be readily detected and clearly marked for later repair.

The present invention provides an electronic system for detecting the acoustic signals generated by the laser during its operation and comparing those signals to the acoustic pattern generated during normal welding operations. When the comparison indicates an abnormality in the welding process, a signal is produced for activating an ink jet that sprays a spot of ink on the sheets of metal being welded at the exact point where a defective weld was produced. However, if the comparison is favorable, indicating the formation of a proper weld, the electronic system sends no signal to the ink jet to activate it.

Since the head of the laser welder typically moves relative to the sheets being welded, the present invention employs an input signal indicating that such movement is occurring. It also employs an input signal indicating that the laser itself is being energized in normal fashion. Unless both those signals are present the ink jet cannot be activated thereby preventing the inadvertent spraying of ink on the sheets being welded.

DESCRIPTION OF THE DRAWINGS

The invention is described in more detail below with particular reference to the attached drawings in which:

FIG. 4A and 4B are a wiring diagram of the electronic circuit employed in the preferred embodiment of the invention.

DESCRIPTION OF WELDING PROCESS

Figure 1:
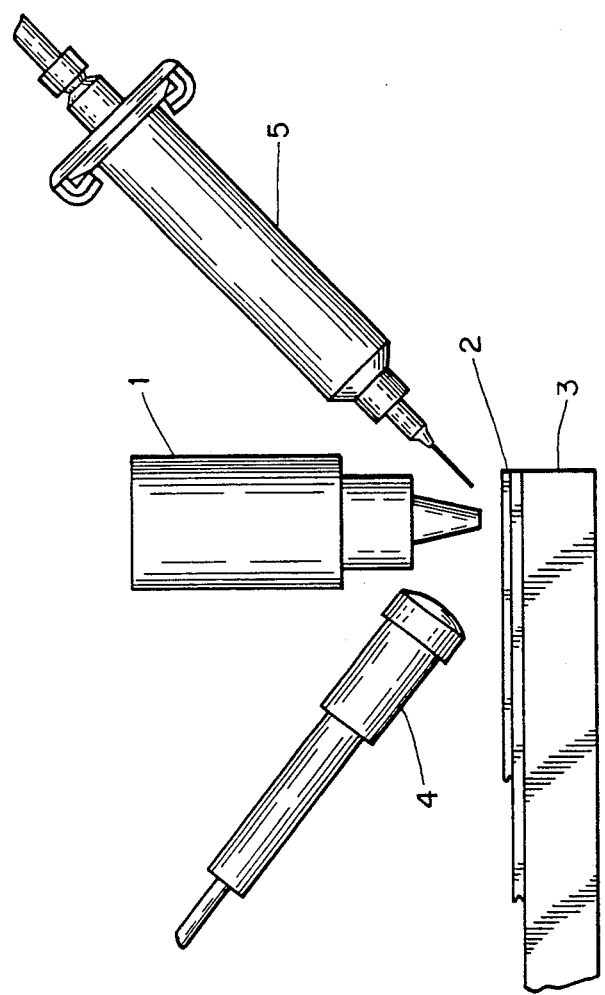
FIG. 1 shows elements of the present invention and a laser welder in operative position relative to the sheets of metal being welded.

Referring first to FIG. 1, there is shown a laser welding head 1 in operative position adjacent a pair of 0.008 inch thick metal sheets 2 secured to a supporting structure 3. After being welded, the sheets are assembled into a gas turbine's recuperator (not shown). Numerically controlled means (not shown) move the laser head relative to the metal sheets along the path where welding is to be done by a beam of energy emitted by the laser welding head. In the preferred embodiment of the invention, the laser beam consists of a series of pulses having a pulse rate of 185 Hz. The pulse duration is 1.8 milliseconds (ms) interspersed between 3.5 ms of "laser off" time for a total duty cycle of 5.3 ms. During the duty cycle, the laser head moves a total of 0.0074 inches, the laser head being energized during 0.0024 inches of the total distance traveled by the head. Although the laser beam's operation is intermittent, the metal is fused by the beam beyond the physical dimensions of the head itself producing, in effect, a continuous weld.

Ideally, every pulse of the laser beam produces a normal, gas tight weld. However, for a variety of reasons, faulty or defective welds may be produced. To detect them, acoustic signals, generated by the sudden heating of the metal sheets by the laser beam, are picked up by a transducer, such as microphone 4, positioned adjacent the laser head. It has been found that the welding process generates an acoustic signal in the 6–9 KHz range during normal welding. A signal of substantially lower amplitude is generated when a faulty weld is being produced. As will be explained, the signals from the laser beam picked up by the microphone are compared to a signal reference pattern characteristic of normal welding operations. If the comparison indicates that a defective weld has been produced, a solenoid operated ink jet 5 adjacent the laser head is activated and sprays ink on the metal sheets at the site of the defective weld. The defect can be repaired later by conventional welding techniques.

ELECTRONIC FAULT DETECTING SYSTEM

Figure 2:
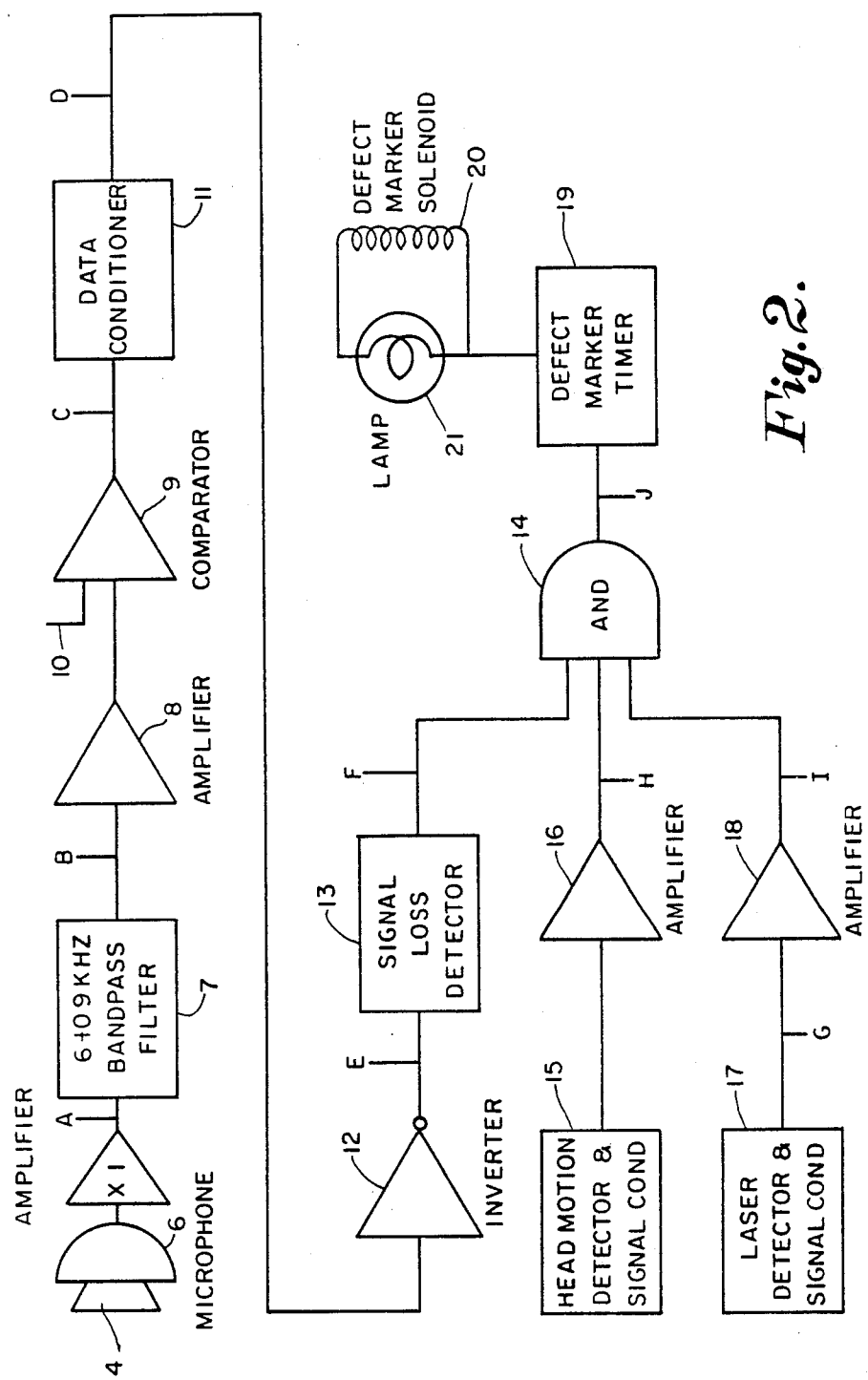
FIG. 2 is a schematic showing the electronic components of the present invention.

The microphone 4 is one component of an electronic fault detecting system shown in FIG. 2. Referring to that figure, it will be noted that the microphone is connected to an impedance matching amplifier 6 which passes its signal to a bandpass filter 7. It in turn passes a band of frequencies in the 6–9 KHz range with little or no attenuation to amplifier 8 connected to comparator 9. A reference signal, characteristic of normal welding operation, is supplied at 10 to the comparator. As will be explained more fully with reference to FIG. 3, the output of the comparator indicates either that a favorable comparison to the reference pattern has been made and that the weld is normal, or that the comparison is unfavorable indicating that the weld is faulty.

The output signal of the comparator is supplied to a data conditioner 11 which is a one-shot multivibrator set for a pulse duration of 1.8 ms with an interval of 3.5 ms, the total duration being equal to the welder's duty cycle. The data conditioner shapes the signal for further processing by an inverter 12. The inverted signal from inverter 12 is then supplied to a signal loss detector 13 the output of which is fed to an "and" gate 14.

Also fed to the gate is a signal from a head motion detector and signal conditioner 15, the signal being amplified and inverted by amplifier 16. Another signal is fed to gate 14 by a laser detector and signal conditioner 17, the signal being amplified and inverted by amplifier 18. The presence of an output signal from the head motion detector and signal conditioner 15 indicates that the laser welding head 1 is in motion; the output signal from the laser detector and signal conditioner 17 indicates that the laser beam is operational. When those signals are present and the signal from the signal loss detector 13 indicates that faulty welding has occurred, the combined signals, passed by the "and" gate 14, are conditioned by a defect marker timer 19 to produce a pulse of electrical energy sufficient to activate solenoid 20 comprising an integral part of the ink jet 5 adjacent the laser welding head. Activation of the solenoid causes the ink jet to spray ink on metal sheets 2 thereby marking the location of the defective weld.

When the solenoid is activated, a lamp 21 is simultaneously lighted visually indicating to the operator of the welding equipment that faulty operation has occurred. Should the light remain lighted for an extended period, such as several seconds, the operator will be alerted to a major malfunction of the welding equipment and be able to take corrective action promptly.

The components of the system are energized by a multi-voltage bi-polar DC power supply (not shown).

Figure 4A:
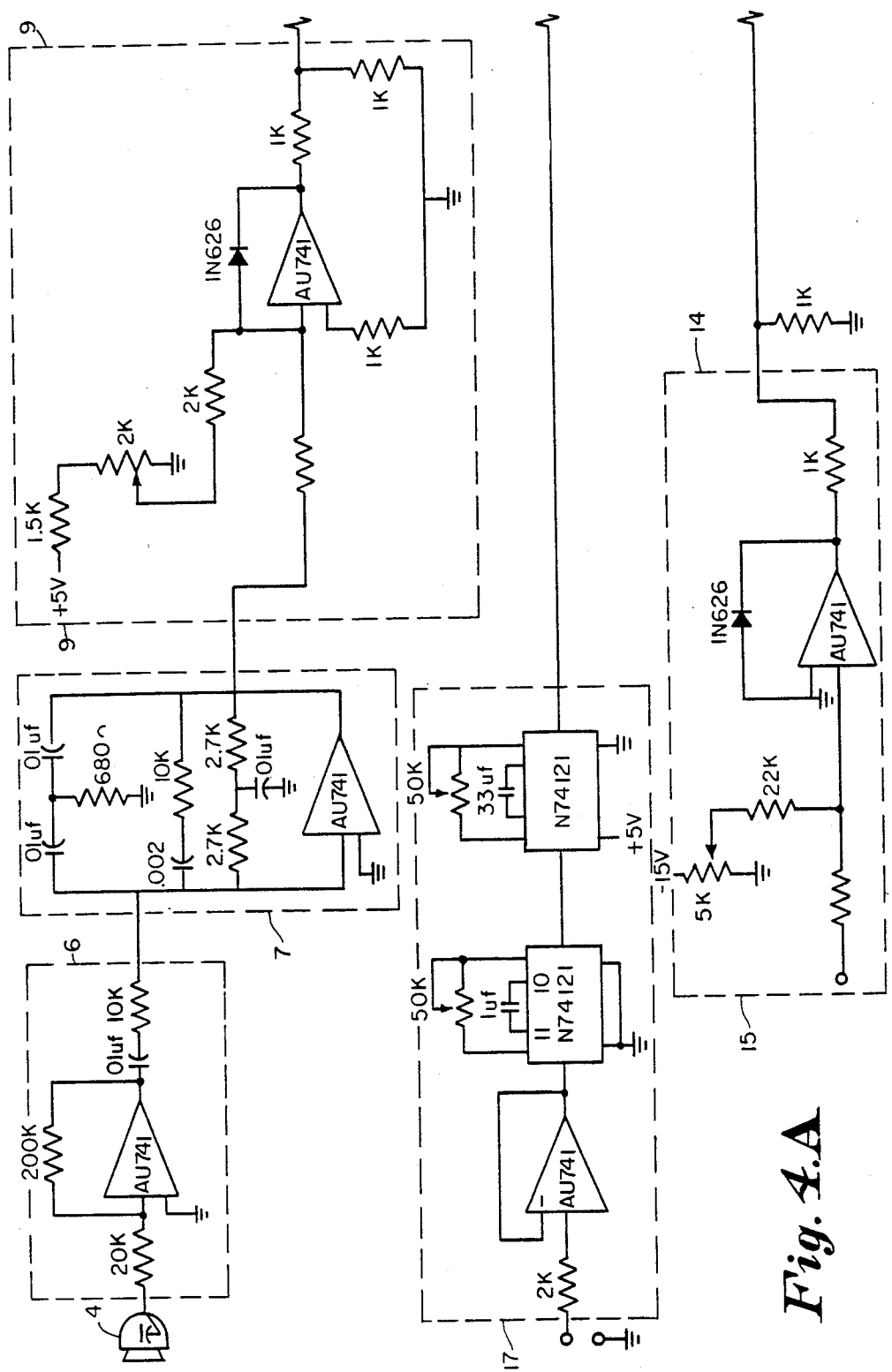

The wiring diagram of FIG. 4A and 4B shows the circuit employed in the preferred embodiment of the invention. In FIG. 4A and 4B, the elements, shown in FIG. 2, are enclosed in dash lines and are designated by the same reference numbers shown on that figure. Standard elements, such as UA 741, N 7408, N 74121, and N 74123, are available from many commercial sources, those used in the preferred embodiment having been obtained from Signetics, 811 East Arques Ave, Sunnyvale, Calif. 94086.

It should be noted that, following the teaching of the present invention, the circuitry can be modified to accomodate other types of welding operations, the system being capable of fault detection in the welding of many different metals and gauges.

SIGNAL CHARACTERISTICS

Figure 3:
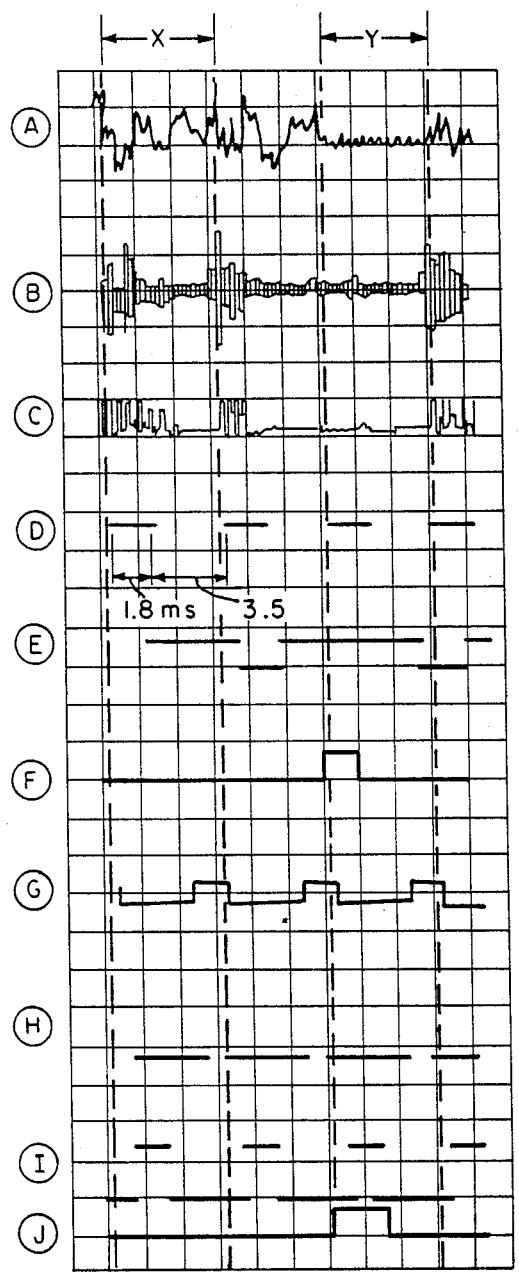
FIG. 3 depicts electronic wave forms associated with the electronic components when normal welds, as well as defective welds, are being produced by the laser welder.

Attention is now directed to FIG. 3 showing the wave forms of signals prevailing at various points in the electronic system, described with reference to FIG. 2, during normal and abnormal welding conditions. The wave forms are designated A through J in FIG. 3, and the points in the electronic system where they occur are designated by comparable letters in FIG. 2. The abscissa of the diagram in FIG. 3 designates elapsed time in milliseconds, the abscissa being divided into two regions marked X and Y. The wave forms in region X are those associated with normal welding while those in region Y are associated with abnormal welding conditions during which a faulty or defective weld is produced.

Directing attention to region X, it will be noted that the acoustic signal picked up by microphone 4 is a complex analog signal as shown at point A. The signal includes a broad range of frequencies, certain of them being generated by the discharge of the laser welding head 1 and others by extraneous background sources. The bandpass filter 7 filters out all frequencies other than those in the range of 6–9 KHz thereby developing a signal having a wave form as shown at point B. As mentioned earlier, that signal is amplified and then compared by comparator 9 to a reference signal pattern characteristic of the formation of a normal weld, thereby developing a signal having the wave form shown at point C. The wave form is at a relatively high voltage, logic high, when the laser beam pulse is producing a normal weld and falls to a low voltage when the laser beam is off.

The signal from the comparator is then shaped by the data conditioner 11 which developes the output signal shown at point D. For a normal weld, the wave form is at a uniform high voltage for the 1.8 ms time that the laser beam was energized and at zero voltage during the 3.5 ms that the beam was off. Inverter 12 inverts the signal producing the wave form, shown at E, and feeds it to the signal loss detector 13. The portion of the signal above zero reference is increased in duration to assure proper operation of the signal loss detector since it must be replenished with a 1.8 ms pulse every 6.15 ms to assure that it will not go to logic high even though normal welding is occurring. In practice, it has been found that the 6.15 ms time period is appropriate, being equal to the duration of the welding cycle plus half the pulse time of the laser welding head when it is energized.

When the welding process is producing normal welds, the output of the signal loss detector is a steady logic low (low voltage) signal as shown at F. That signal is combined by the "and" gate 14 with the signals from the head motion detector and signal conditioner 15 and the laser detector and signal conditioner 17. The signal from the laser detector and signal conditioner is shown at point G. After passing through amplifier 18, the signal has the wave form shown at point I. Concurrently, the signal from the head motion detector and signal conditioner 15 is amplified by amplifier 16 and has the wave form shown at point H. Signals F, H, and I are combined by the "and" gate resulting in a wave form shown at point J.

When the weld that generated the original acoustic signal is normal, the wave form at point J remains at a logic low (low voltage) level. Such a signal will not cause the defect marker timer 19 to produce a pulse of energy for activating the defect marker solenoid 20. Hence, the ink jet 5 will not spray any ink on the sheets being welded.

Directing attention now to region Y of the diagram shown in FIG. 3, it will be noted that the analog signal at point A does not include proper components. This is clearly indicated by the low profile of the wave after passing through the bandpass filter as shown at point B.

Since the reference signal pattern supplied to comparator 9 does not compare favorably with wave form B, the output of the comparator is a substantially continuous low voltage signal (shown at point C) which is then fed to data conditioner 11. Its output is a wave form at a uniform logic low (low voltage) level as shown at point D. Inverter 12 transforms that logic low signal to a logic high signal as shown at point E. That causes the signal loss detector 13 to develop a logic high signal as shown at F. That signal, when combined by the "and" gate 14 with those from the head motion detector and signal conditioner 15 and from the laser detector and signal conditioner 17, produces a logic high signal at point J. Such a signal causes the defect marker timer 19 to produce a pulse of energy sufficient to activate the defect marker solenoid 20. As explained earlier, energization of the solenoid causes ink jet 5 to spray ink on the sheets being welded at the point where the faulty weld was produced.

CONCLUSION

From the foregoing description of the preferred embodiment of the invention, it will be understood that the present invention may be used to great advantage in an intermittently energized high speed laser welder to detect and mark the location of any defective weld that may be produced. The novel system is automatic in operation and accurately marks the location of such faulty welds despite the fact that the welding process continues to operate thereafter in normal fashion. As a result, the defective welds can readily be located and repaired at a later time without difficulty.

According to the above description, the following invention is claimed as novel and is desired to be secured by Letters Patent of the United States.

We claim:

1. A laser welder fault detector for use with an intermittently energized laser head that is movable relative to metal sheets to be welded and positioned relative to the sheets to discharge energy for welding the sheets together, the energy discharge producing acoustic signals having a low amplitude when defective welds are being produced and a relatively greater amplitude when normal welds are being produced comprising:
    a microphone for detecting the acoustic signals associated with the energy discharge and producing an output signal;
    an impedance matching amplifier for amplifying the output signal from said microphone and producing another output signal;
    a low frequency narrow bandpass filter having a low frequency narrow bandpass of about 6 KHz to about 9 KHz connected to said impedance matching amplifier for receiving and passing only that portion of said impedance matching amplifier output signal generated by acoustic signals received by said microphone in the range of about 6 KHz to about 9 KHz;
    means for amplifying the signals passed by said bandpass filter;
    a comparator for comparing the signals from said last named means with a signal pattern characteristic of the formation of normal welds and for producing an output signal indicating whether the comparison was favorable or unfavorable;
    a data conditioner for shaping the output signal from said comparator;
    means for inverting the shaped signals produced by said data conditioner;
    a signal loss detector for producing an output signal when the inverted signal from said inverter indicates formation of a faulty weld; and
    means activated by the last named output signal for recording the location of the faulty weld.

2. A laser welder fault detector as described in claim 1 in which said last named means is a solenoid actuated ink jet for spraying ink on the sheets being welded at the location of the faulty weld.

3. A laser welder fault detector as described in claim 2 further comprising:
    means for producing a signal indicating that the laser head is in motion relative to the sheets being welded;
    means for producing a signal indicating that the laser head is being intermittently energized; and
    means for combining the signals from the last two named means and the signal from said signal loss detector to produce a signal for activating said ink jet when the combined signals indicate that the laser is energized and in motion and that a faulty weld has been produced.

4. A laser welder fault detector as described in claim 3 further comprising:
    a lamp that is energized when said ink jet is activated.

5. A fault detector for use with an intermittently energized laser welder including a laser head movable with respect to metal sheets to be welded and positioned to discharge energy for welding the metal sheets together, the energy discharge producing acoustic signals having amplitudes characteristic of the formation of normal welds and of the formation of faulty welds comprising:
    a microphone for detecting the acoustic signals associated with the laser discharge;
    electronic circuit means for comparing signals derived from said microphone with a signal characteristic of the formation of normal welds and producing an output signal indicating the formation of a faulty weld, said electronic circuit means including a low frequency narrow bandpass filter having a low frequency narrow bandpass of about 6 KHz to about 9 KHz for receiving and passing only that portion of said signals derived from said microphone generated by acoustic signals received by said microphone in the range of about 6 KHz to about 9 KHz;
    means for producing an output signal indicating that the laser head is in motion with respect to said metal sheets;
    means for producing an output signal indicating that the laser head is discharging energy; and
    means for combining the first, second and third named signals to produce a fourth output signal for locating the site of the formation of a faulty weld.

6. A fault detector for use with a laser welder as described in claim 5 further comprising:
    a solenoid operated ink jet actuated by the last named signal to spray ink on the metal sheets to indicate the location of the faulty weld.

* * * * *